(12) United States Patent
Oishi et al.

(10) Patent No.: US 6,450,886 B1
(45) Date of Patent: Sep. 17, 2002

(54) FOOT SWITCHER, FOOT SWITCH SHEET AND MAT FOR USE IN THE SAME

(75) Inventors: Toshimitsu Oishi, Akashi; Toru Okubo; Tomoya Yamano, both of Kobe, all of (JP)

(73) Assignee: Konami Co., Ltd., Tokyo (JP)

( * ) Notice: Subject to any disclaimer, the term of this patent is extended or adjusted under 35 U.S.C. 154(b) by 0 days.

(21) Appl. No.: 09/544,361

(22) Filed: Apr. 6, 2000

(30) Foreign Application Priority Data

Apr. 9, 1999 (JP) .......................................... 11-103407
Apr. 9, 1999 (JP) .......................................... 11-103408

(51) Int. Cl.$^7$ ................................................ A63F 13/00
(52) U.S. Cl. .......................... 463/36; 463/47; 200/61.1; 200/86.5
(58) Field of Search ............................... 463/36–38, 46, 463/47; 200/86 R, 61.1, 86.5; 345/184.419, 173; 341/34, 20, 27

(56) References Cited

U.S. PATENT DOCUMENTS

| 3,787,278 | A | * | 1/1974 | Ready et al. ................ 161/159 |
| 3,821,500 | A | * | 6/1974 | Newman ................... 200/86 R |
| 4,121,488 | A | * | 10/1978 | Akiyama ..................... 84/1.01 |
| 4,403,122 | A | * | 9/1983 | Wise, III ..................... 200/5 A |
| 4,497,989 | A | * | 2/1985 | Miller ....................... 200/86 R |
| 4,684,767 | A | | 8/1987 | Phalen |
| 4,720,789 | A | * | 1/1988 | Hector et al. ................. 700/91 |
| 4,773,155 | A | * | 9/1988 | Buchien ....................... 29/622 |
| 5,077,849 | A | * | 1/1992 | Farley ............................ 5/464 |
| 5,225,288 | A | * | 7/1993 | Beeson et al. ............... 428/475 |
| 5,414,256 | A | * | 5/1995 | Gurner et al. ............... 250/221 |
| 5,542,676 | A | | 8/1996 | Howe, Jr. et al. |
| 5,695,859 | A | * | 12/1997 | Burgess ....................... 428/209 |
| 5,837,952 | A | * | 11/1998 | Oshiro et al. ............. 200/86 R |
| 5,886,615 | A | * | 3/1999 | Burgess ....................... 338/114 |
| 5,889,510 | A | * | 3/1999 | Klarlund ...................... 345/168 |
| 6,078,014 | A | * | 6/2000 | Kashiwazaki et al. ... 200/61.43 |
| 6,091,402 | A | * | 7/2000 | Howell ........................ 345/157 |
| 6,103,160 | A | * | 8/2000 | Uchida ........................ 264/113 |
| 6,110,073 | A | * | 8/2000 | Saur et al. ....................... 482/8 |
| 6,270,414 | B2 | * | 8/2001 | Roelofs ........................ 463/36 |

FOREIGN PATENT DOCUMENTS

| CA | 2178282 | * | 6/1996 |
| JP | 62-53530 | | 4/1987 |
| JP | 63-11089 | | 1/1988 |
| JP | 63-74178 | | 5/1988 |
| JP | 8-270167 | | 10/1996 |
| JP | 9-188731 | | 7/1997 |
| JP | 9-326216 | | 12/1997 |
| TW | 71508 | | 10/1983 |
| TW | 85106811 | | 7/1998 |

* cited by examiner

Primary Examiner—Jessica Harrison
Assistant Examiner—John M Hotaling, II
(74) Attorney, Agent, or Firm—Jordan and Hamburg LLP

(57) ABSTRACT

A foot switcher includes: a foot switch sheet having a plurality of pressure switches for detecting steps; and a mat placed under the foot switch sheet, and including a mat body having a plurality of divisions, one division being different from another division in hardness, and a specified number of divisions corresponding to the plurality of pressure switches, respectively. The hardness of one division is different from that of another division adjoining the one division. A top layer for covering the plurality of the pressure switches is formed with slip preventer.

11 Claims, 15 Drawing Sheets

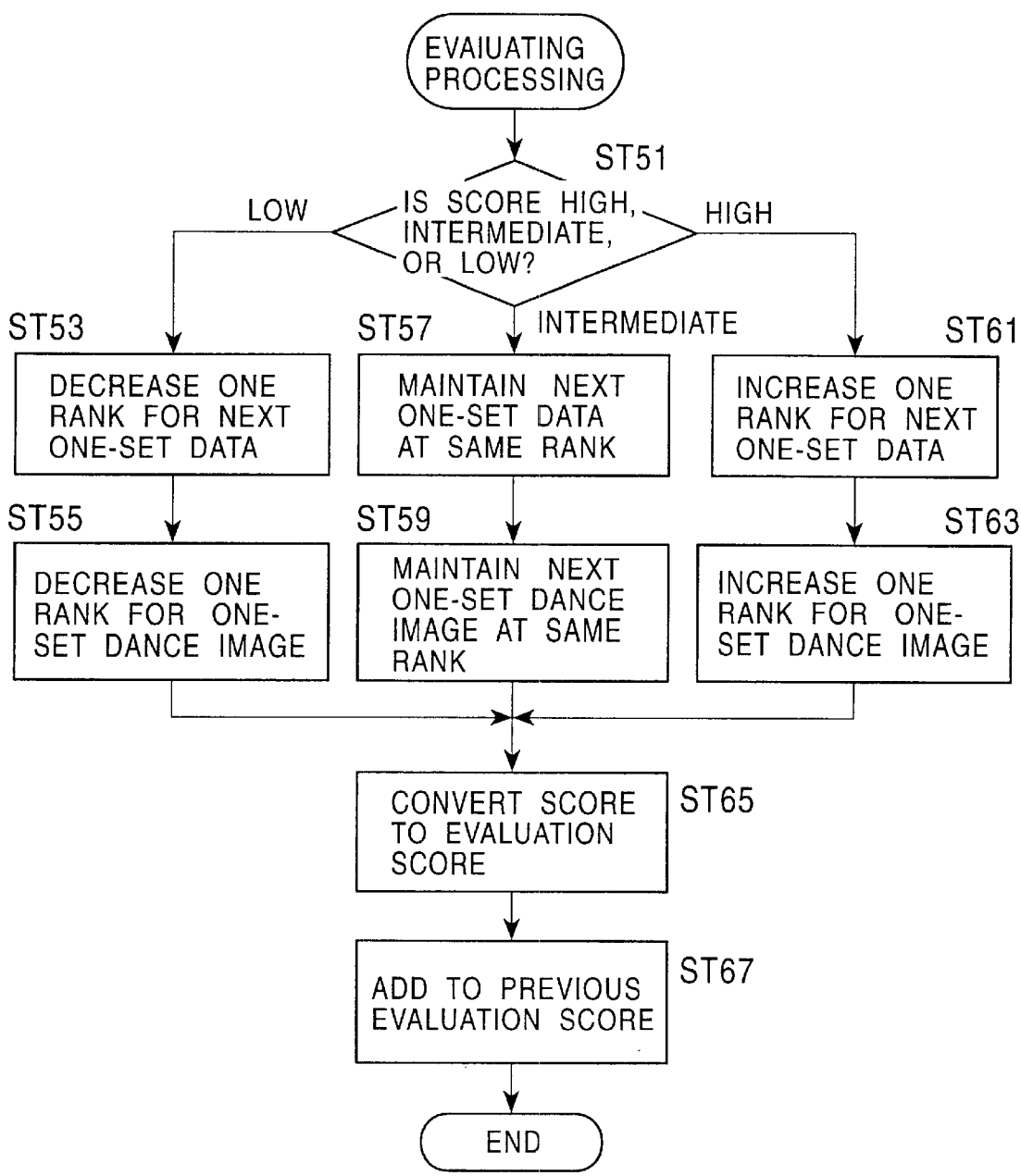

FOOT SWITCHER, FOOT SWITCH SHEET AND MAT FOR USE IN THE SAME

This application is based on patent application Nos. 11-103407 and 11-103408 filed in Japan, the contents of which are hereby incorporated by references.

BACKGROUND OF THE INVENTION

This invention relates to a flat foot switcher, a foot switch sheet and a mat which are used in the flat foot switcher.

There have been recently proposed quick response performance game machines, such as dance game machine, exercise game machine, using a foot switcher. For example, a dance game machine allows a game player to step in accordance with step instructions from a game machine, and evaluates the stepping performance of the game player based on coincidences between the step instructions and the actual steps. Specifically, the dance game machine comprises a sound generator for generating selected music sounds to a game player, a step instructor for giving step instructions to the game player, a foot switcher for detecting stepping of the game player, and a controller for centrally controlling the operation of the generator, instructor, and switcher.

In the field of such quick response performance game machines, for the following reasons, improvements have been demanded to ensure more joyful game in a variety of locations. In such game, the stepping of the game player is detected by the foot switcher. The game player moves his/her foot swiftly over the foot switcher to follow step instructions generated by the instructor. Accordingly, there is a high likelihood that the game player slips over the foot switcher. Also, the game player moves hotly over the foot switcher, consequently causing undesirable noises.

Japanese Patent No. 2816837 discloses a foot switcher including a plurality of pressure switches for detecting a step performed by a player. The foot switcher has a multi layer construction which includes an upper electrode layer, a spacer, and a lower electrode layer. A plurality of switch regions are provided to input a plurality of data items into a computerized apparatus. However, this foot switcher has no means for preventing the game player from slipping thereover. Accordingly, there has been demanded a foot switcher which enables the game player to reliably touch a step detection switch without any slip.

Also, the problem of noise must be solved to enable such game machine to be used in home. It will be seen that such game can be performed in home by utilizing a personal computer. For this purpose, the noise, which is caused by stepping, have to be reduced greatly. If the noise by stepping is not be suppressed, conversely, the hot game is impossible in home. Accordingly, there has been strongly demanded a foot switcher which makes it possible to reduce the noise by stepping greatly.

Further, the foot switcher generally has active regions corresponding to step detection switches and inactive regions not corresponding to step detection switches. The game player steps seeing or focusing the step instruction from the step instructor. Accordingly, it is hard or difficult for the game player to judge a targeted active region while stepping. Accordingly, there has been strongly demanded a foot switcher which makes it possible for the game player to feel or recognize a targeted active region without seeing the foot switcher.

SUMMARY OF THE INVENTION

It is an object of the present invention to provide a foot switcher, a foot switch sheet and a mat which are free of the problems residing in the prior art.

According to an aspect of the present invention, a mat comprises a mat body having a plurality of divisions, one division being different from another division in hardness.

According to another aspect of the present invention, a foot switch sheet is provided with a plurality of pressure switches arranged in a specified pattern for detecting steps, and a top layer for covering the plurality of pressure switches. The top layer is formed with slip preventer.

According to still another aspect of the present invention, a foot switcher comprises a foot switch sheet having a plurality of pressure switches for detecting steps, and a mat placed under the foot switch sheet, and including a mat body having a plurality of divisions, a specified number of divisions corresponding to the plurality of pressure switches, respectively. One division is different from another division in hardness.

These and other objects, features, aspects, and advantages of the present invention will become more apparent from the following detailed description of the preferred embodiments.

BRIEF DESCRIPTION OF THE DRAWINGS

FIG. 17 is a flowchart showing an evaluation processing in step ST15 of the main game operation routine.

DESCRIPTION OF THE PREFERRED EMBODIMENT

Figure 1:
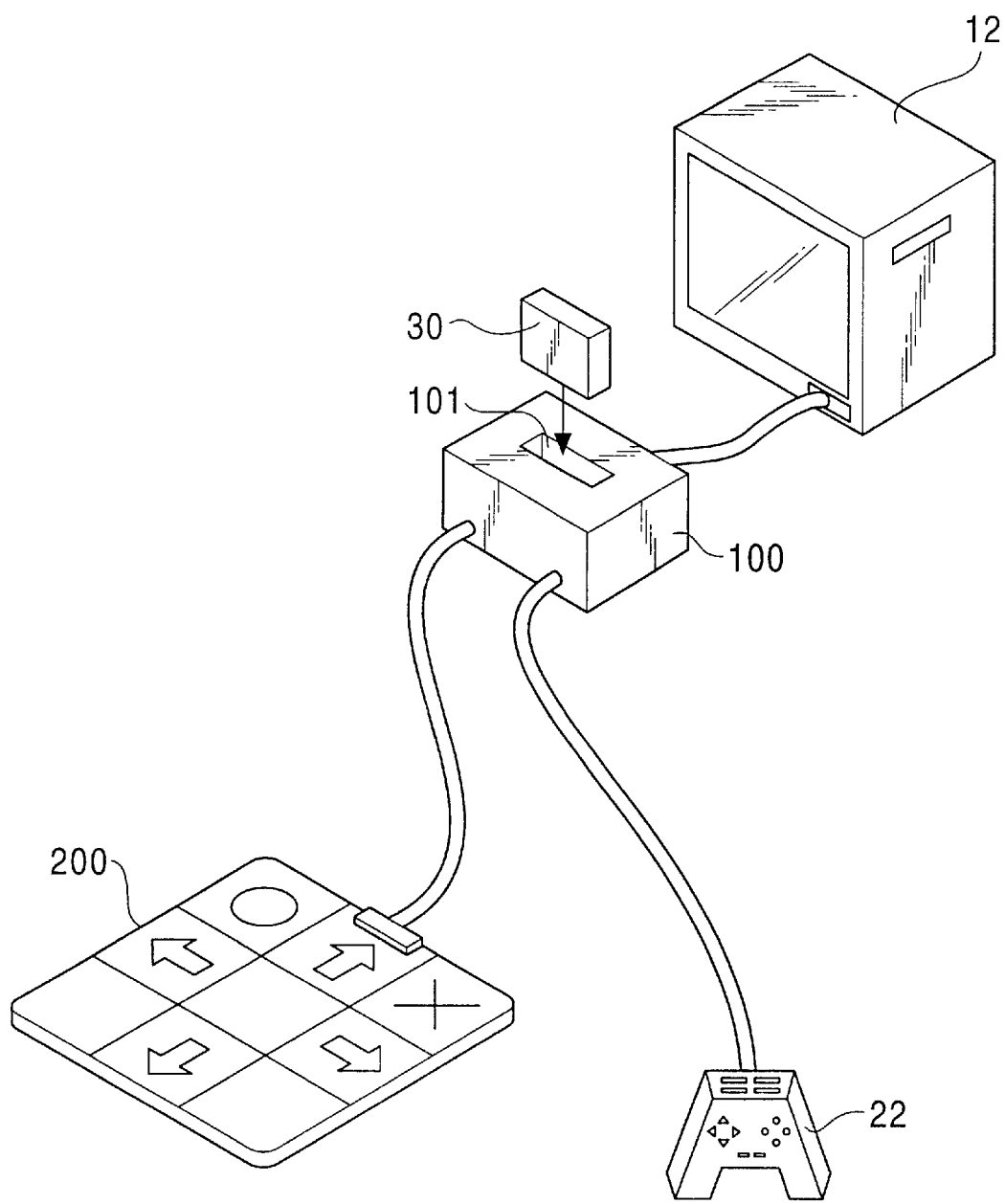
FIG. 1 is a perspective view of a home-use game machine using a flat foot switcher according to an embodiment of the invention.

FIG. 1 is a perspective view showing an overall construction of a home-use game machine using a flat foot switcher according to an embodiment of the present invention. The game machine is constructed by a main controller 100, a hand controller 22 connected to the main controller 100 for inputting various instructions, a foot switcher 200 connected to the main controller 100 for detecting stepping of the game player in a dance game, and a monitor 12 for displaying dance game images. In the main controller 100, a recording medium 30 in which data such as dance-game program data is recorded is removable from a loader 101.

Figure 2:
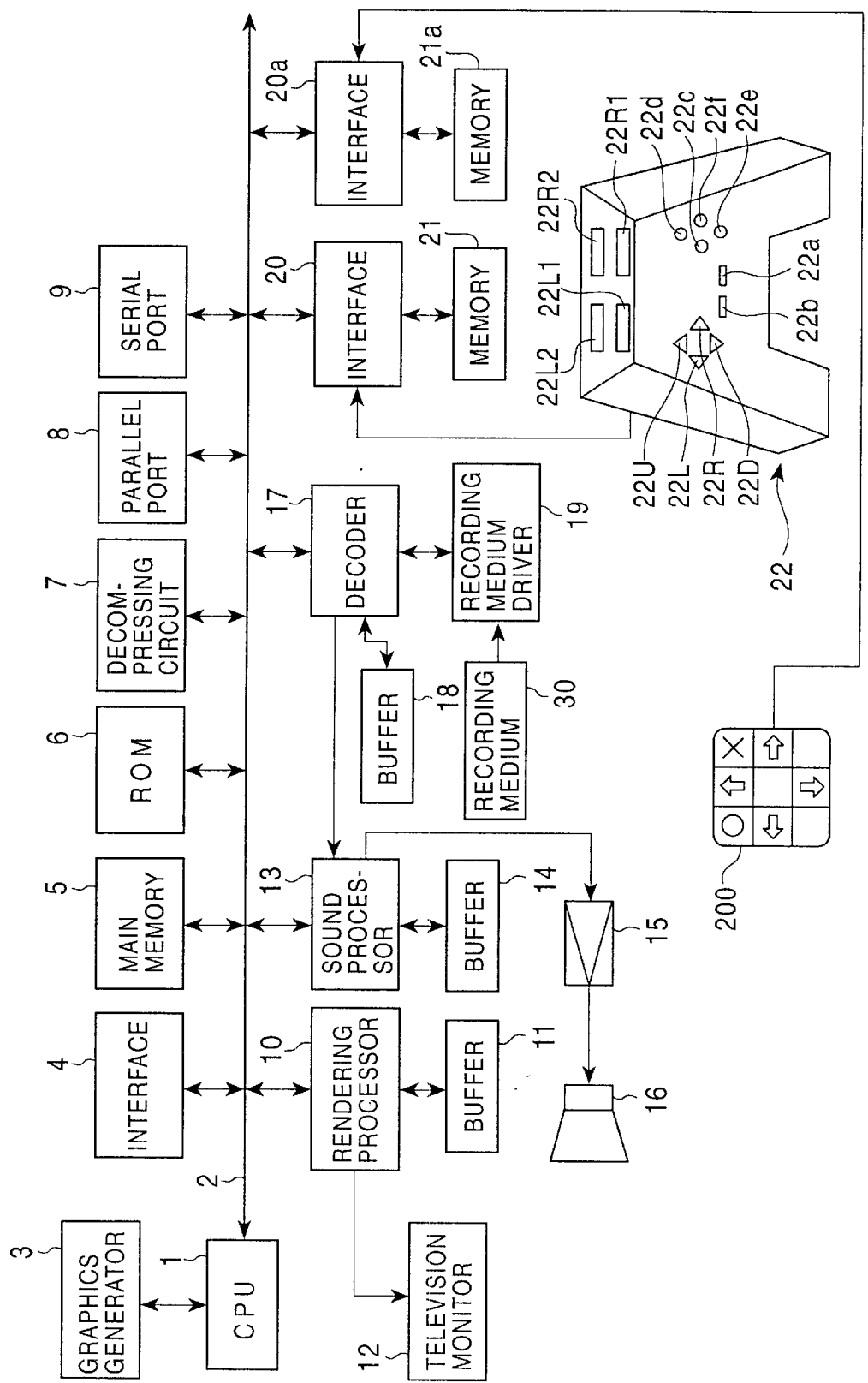
FIG. 2 is a block diagram showing a construction of the game machine.

In this arrangement, there are two interfaces 22 and 22a, and the foot switcher 200 is connected to one of them, that is, the interface 20a (shown in FIG. 2). However, in an arrangement in which two hand controllers 22 must be connected, both the interfaces 20 and 20a may be connected to the hand controller 22. In this case, the foot switcher 200 may be connected to another interface circuit 4 in the main controller 100 (shown in FIG. 2), which is described below.

FIG. 2 is a block diagram showing a construction of the game machine. The main controller 100 of the game machine has a CPU 1; a bus 2 including an address bus, a data bus, and a control bus which are individually connected to the CPU 1; and individual components connected to the bus 2.

The bus 2 is connected to a graphics-data generator 3, the interface circuit 4, a main memory 5, a ROM 6, a decompressing circuit 7, a parallel port 8, a serial port 9, a rendering processor 10 with a buffer 11, a sound processor 13 with a buffer 14, a decoder 17 with a buffer 18, and the interface circuits 20 and 20a with memories 21 and 21a.

The monitor 12 is connected to the rendering processor 10. A speaker 16 is connected to the sound processor 13 via an amplifying circuit 15. A recording-medium driver 19 is connected to the decoder 17. The memory 21 and the hand controller 22 are connected to the interface circuit 20. The memory 21a and the foot switcher 200 are connected to the interface circuit 20a.

The game machine varies in configuration according to its use. For home-use configuration of the main controller 100, the monitor 2 and the speaker 16 are separated from the main controller. For commercial-use configuration of the above-described game machine, however, all the components shown in FIG. 2 are integrally stored in a single housing.

When the game machine is configured on the basis of a personal computer or a work station as a main portion, the monitor 2 corresponds to a display device of the computer. The rendering processor 10, the sound processor 13, and the decompressing circuit 7 correspond to part of the program data stored in the recording medium 30 or hardware on an expansion board mounted into an expansion slot of the computer. The interface circuit 4, the parallel port 8, the serial port 9, and the interface circuit 20 correspond to the hardware on the expansion board mounted in the expansion slot of the computer. Also, the buffers 11, 14 and 18 correspond to the main memory 5 or individual areas of an expansion memory (not shown). In this embodiment, the game machine is configured for home use.

(Construction of Home-use Game Machine)

Individual components shown in FIG. 2 are described below. The graphics-data generator 3 functions as a co-processor of the CPU 1. Specifically, the graphics-data generator 3 performs parallel processing for conversion of coordinates and computation of light sources, for example, operations of vectors and fixed-point matrix data strings. Main processings that the graphics-data generator 3 performs include computation of image brightness. The graphics-data generator 3 accesses coordinate data, translation data, and rotation data at the individual vertexes within a two-dimensional or three-dimensional surface in image data sent from the CPU 1, and obtains addresses of processing-object images in display areas. In this manner, the image brightness according to the distance from a virtually-set light source is computed.

The interface circuit 4 interfaces with peripheral devices, particularly, pointing devices, such as a mouse and a trackball. The ROM 6 contains program data as an operating system of the game machine. The program data corresponds to a basic input output system (BIOS) of personal computers.

The decompressing circuit 7 decompresses images compressed by intraframe-coding according to the Moving Photographic Experts Group (MPEG) for moving pictures and the Joint Pictures Experts Group (JPEG) for still pictures. The decompressing includes decoding (decoding of data encoded by a variable length code (VLC)) inverse-quantizing, inverse-discrete-cosine transform (IDCT) processing, and intraframe-image decoding.

The rendering processor 10 renders images in the buffer 11 in response to a rendering command which the CPU 1 issues. The buffer 11 includes a display area and a no display area. The display area is a generation area for data to be displayed on the monitor 12.

In this embodiment, the non-display area is a storage area for storing data including data for defining skeletons, model data for defining polygons, animation data for moving models, pattern data representing characteristics of individual animations, texture data, and color palette data. the texture data is two-dimensional image data. The color palette data is data for specifying colors of data such as the texture data. The CPU 1 pre-records these data items, which are stored in the recording medium 30, in the non-display area of the buffer 11 either in one time or a plurality of times according to the game progress status.

Rendering commands include a command for rendering two-dimensional images by using polygons and a command for rendering standard two-dimensional images. In this embodiment, the polygons are polygonal two-dimensional images, and triangles or rectangles are used.

The rendering command for rendering images by using the three-dimensional images is composed of polygon vertex address data in the display area in the buffer 11, texture address data which represents storing positions in the buffer 11 for the texture data to be pasted on the polygons, color palette address data which represents storing positions in the buffer 11 for color palette data representing the color of the texture data, and brightness data which represents the brightness of the texture data.

In these items of data, the polygon vertex address data is polygon vertex-coordinate data in a two-dimensional space by which the graphics-data generator 3 has replaced polygon vertex-coordinate data in a three-dimensional space, which had been sent from the CPU 1, by performing coordinate conversion according to the translation data and rotation data of the image.

The polygon vertex address data represents addresses in the display area in the buffer 11. The rendering processor 10 writes texture data corresponding to a range of the display area in the buffer 11, which is represented by three or four pieces of the polygon vertex address data. One object is composed of many polygons. The CPU 1 associates coordinate data for the individual polygons in the three-dimensional space with corresponding skeleton vector data, and stores the associated data in the buffer 11. Processes described below are executed in response to operations effected on the hand controller 22 for moving characters, i.e., for presenting motion of the characters or for changing character-viewing positions.

The CPU 1 supplies the graphics-data generator 3 with the vertex three-dimensional coordinate data for the individual polygons, which is preserved in the non-display area of the buffer 11, and the translation data and the rotation data on the individual polygons, which have been obtained from data on coordinates and the amount of rotation of the skeletons.

On the basis of the vertex three-dimensional data on the individual polygons and the translation data and the rotation data on the individual polygons, the graphics-data generator 3 sequentially obtains three-dimensional coordinate data after movement and rotation of the individual polygons. In the three-dimensional coordinate data on the individual polygons, which has thus been obtained, coordinate data in horizontal and perpendicular directions is supplied to the rendering processor 10 as the address data in the display area in the buffer 11, that is, as the polygon vertex address data.

The rendering processor 10 writes texture data represented by pre-allocated texture address data in the triangular or rectangular display area in the buffer 11, which is represented by three or four pieces of the polygon vertex address data. As a result, objects individually composed of many polygons on which texture data is pasted are displayed on the monitor 12.

The rendering command for rendering standard two-dimensional images is composed of vertex address data, texture address data, color palette address data which represents storing positions in the buffer 11 for the color palette data representing the color of the texture data, and brightness data which represents the brightness of the texture data. In these items of data, the vertex address data is coordinate data which the graphics-data generator 3 can obtain by performing coordinate conversion for vertex-coordinate data in a two-dimensional surface according to the translation data and the rotation data which had been sent from the CPU 1.

The sound processor 13 writes ADPCM (adaptive differential pulse code modulation) data read from the recording medium 30 into the buffer 14 and uses the ADPCM data stored in the buffer 14 as a sound source. Also, the sound processor 13 uses, for example, a clock having a frequency of 4.1 kHz to read out the ADPCM data. The sound processor 13 performs pitch conversion, addition of noise, envelope setting, level setting, addition of reverb, and the like for the ADPCM data read out of the buffer 14. When the sound data read out of the recording medium 30 is PCM (pulse code modulation) data, such as compact-disk digital audio (CD-DA), the sound processor 13 converts the data to ADPCM data. Also, processing by the program data for the PCM data is performed directly in the main memory 5. The PCM data processed in the main memory 5 is supplied to the sound processor 13 and is converted to the ADPCM data. Thereafter, and the ADPCM data is subjected to other processing described above and is outputted through the speaker 16 as sound data.

The recording-medium driver 19 is, for example, a CD-ROM drive,, a hard-disk drive, an optical-disk drive, a flexible-disk drive, a silicon-disk drive, a cassette-medium-reading machine. As for the recording medium 30, it is, for example, a CD-ROM, a hard disk, an optical disk, a flexible disk, or semiconductor memory. The recording-medium driver 19 reads image, sound, and program data from the recording medium 30, and feeds the read data to the decoder 17. The decoder 17 performs error-correction processing for reproduced data sent from the recording-medium driver 19 by using error correction code (ECC) and feeds the corrected data to the main memory 5 or sound processor 13.

The memories 21 and 21a are made of, for example, a holder and a card memory. The card memory retains parameters for individual games so as to store, for example, a game completion status.

The hand controller 22 is externally operable operating means which the game player operates. The hand controller 22 has a first left button 22L1, a second left button 22L2, a first right button 22R1, a second right button 22R2, an up key 22U, a down key 22D, a left key 22L, a right key 22R, a start button 22a, a select button 22b, a first button 22c, a second button 22d, a third button 22e, and a fourth button 22f.

The up key 22U, the down key 22D, the leftward key 22L, and the right key 22R are used by the game player to request the CPU 1 to move a character, for example, upward, downward, rightward, and leftward. The start button 22a is used by the game player to contact the CPU 1 so as to start the game program loaded from the recording medium 30. The select button 22b is used by the game player to request the CPU 1 so as to execute options regarding the game program loaded from the recording medium 30 to the main memory 5. The first left button 22L1, the second left button 22L2, the first right button 22R1, and the second right button 22R2 function differently depending on the game program data loaded form the recording medium 30.

The foot switcher 200 is, similarly to the above-described hand controller 22, externally operable operating means. It allows the game player to step thereon for operation.

(Arrangement of Foot Switcher)

Figure 3:
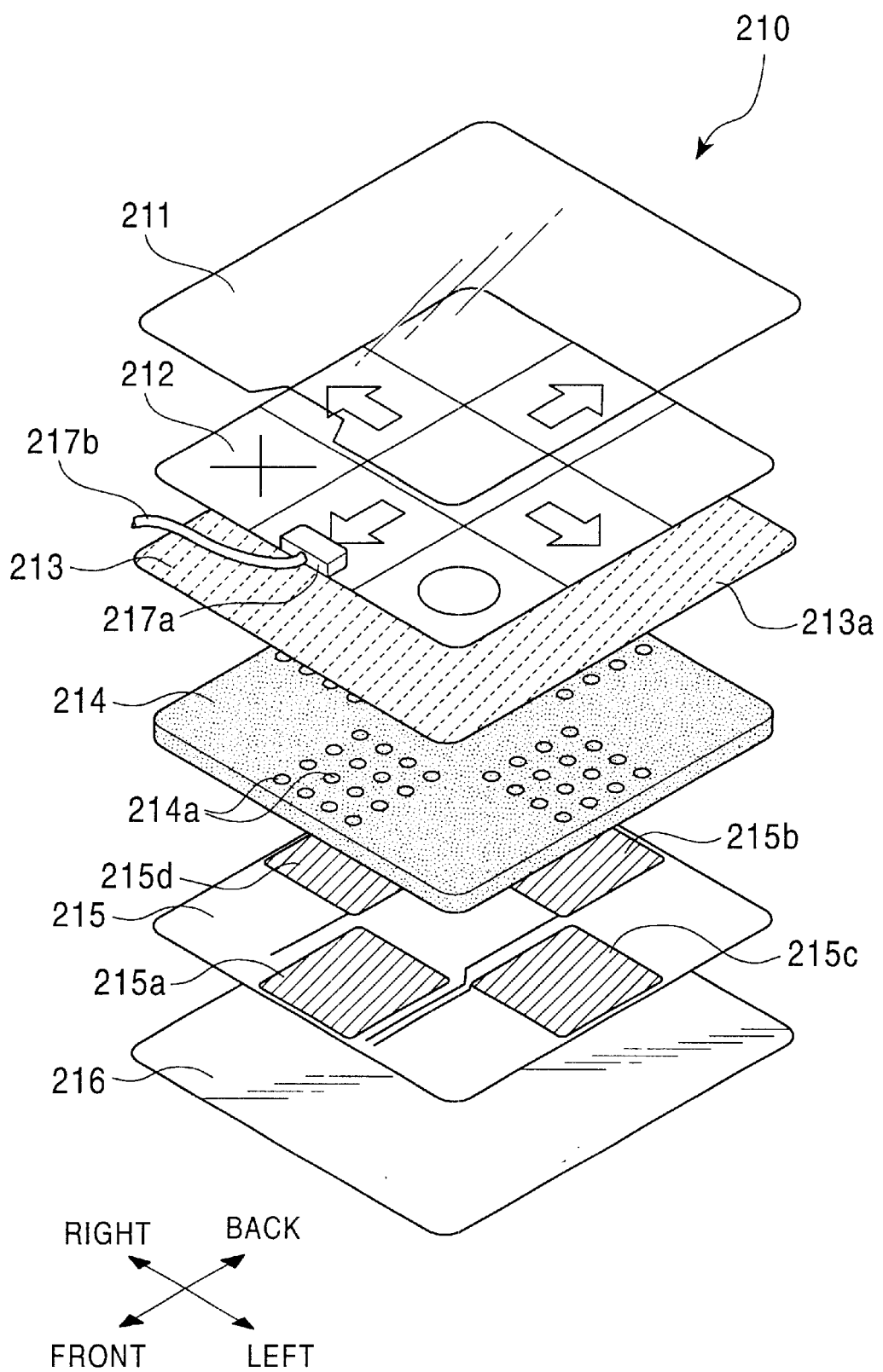
FIG. 3 is an exploded perspective view of a foot switch sheet of the foot switcher.
Figure 4:
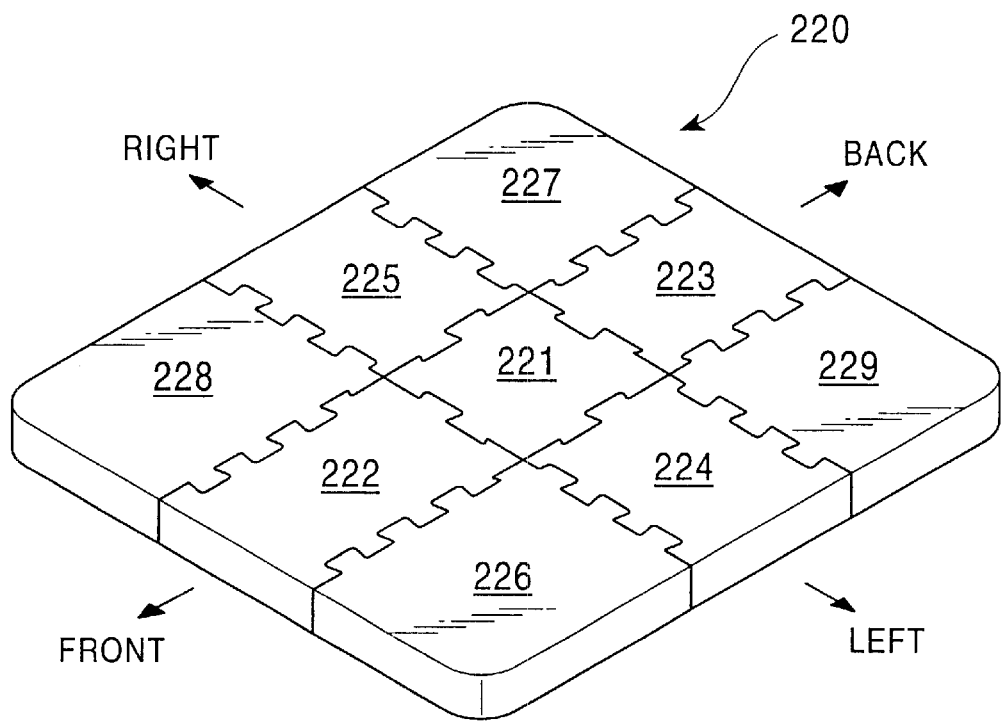
FIG. 4 is a perspective view showing an overall construction, of a mat of the foot switcher.
Figure 5A:
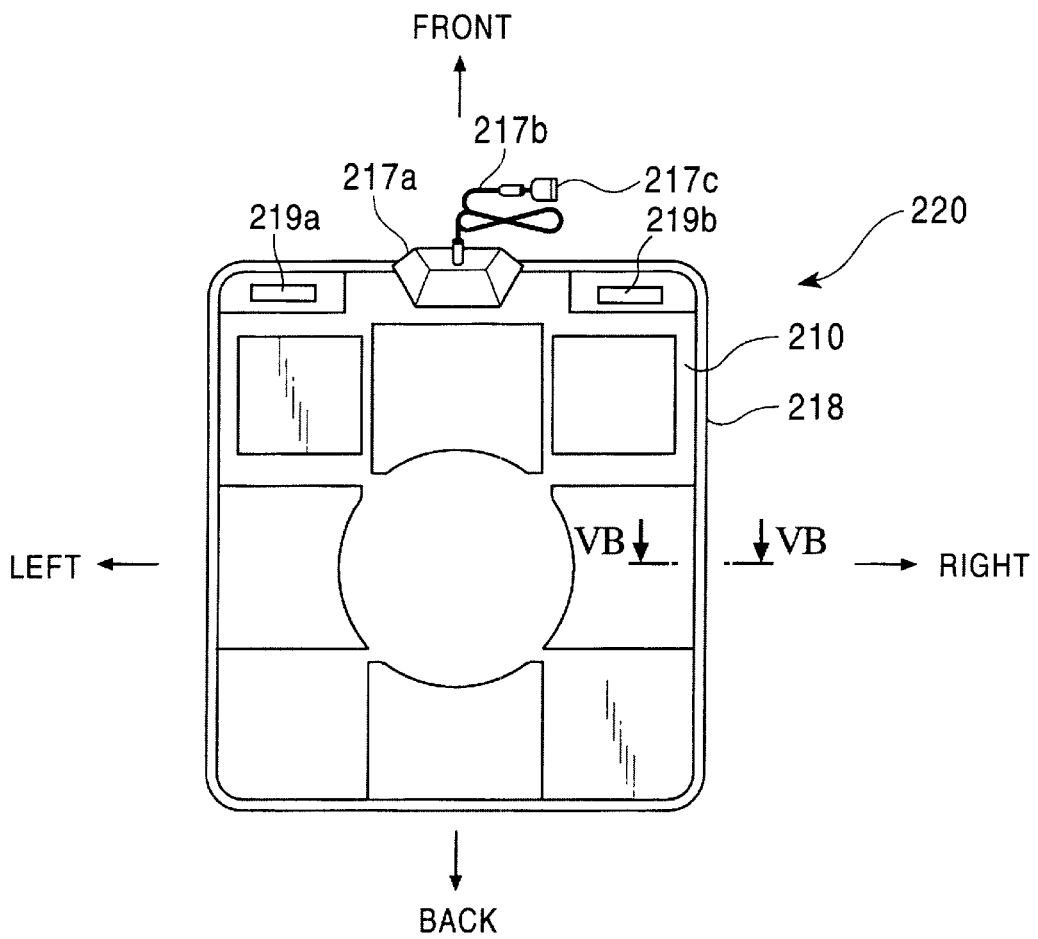
FIG. 5A is a top plan view showing the foot switch sheet.
Figure 5B:
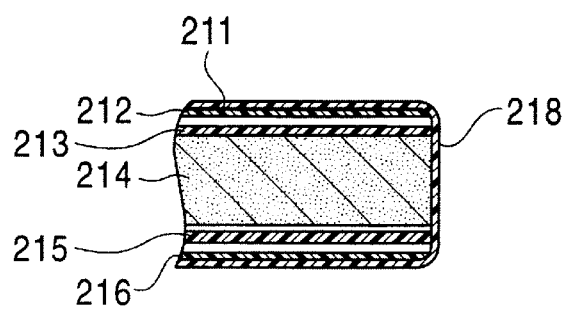
FIG. 5B is a cross-sectional view along the VB—VB line of the foot switch sheet in FIG. 5A.

As shown in FIGS. 3 and 4, the foot switcher 200 includes a planar foot switch sheet 210 having a rectangular shape and a mat 220 having a rectangular shape. The mat 220 is placed under the foot switch sheet 210. The foot switch sheet 210 has a six layer construction including a first layer 211 made of a transparent EMMA (ethylene-methyl methacrylate), a second layer 212 made of a printed soft-PVC, a third layer 213 made of soft-PVC, a fourth layer 214 made of urethane, a fifth layer 215 made of PET, and a sixth layer 216 made of EVA. An entire bottom surface of the third layer 213 is coated with a carbon layer. Specified positions of a top surface of the fifth layer 215 are formed with spot carbon layers. Also, as shown in FIGS. 5A AND 5B, the layers are held in fixed position by winding on the periphery of the layers 211 to 216 by a polyester tape 218. The materials described above are just examples, and they may be substituted by other materials having similar characteristics.

Figure 6:
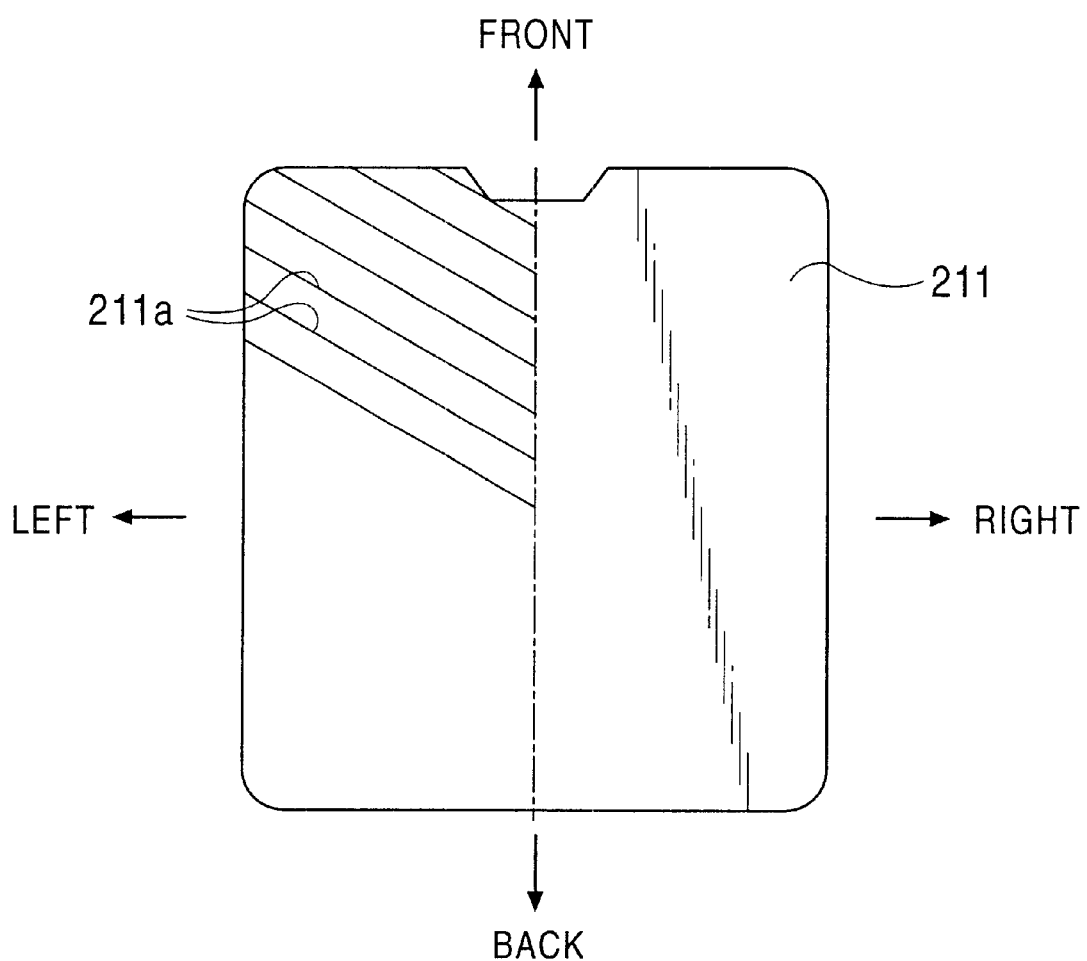
FIG. 6 is a top plan view showing a groove pattern on the surface of a first layer.

In the aforementioned layers, since the first layer 211 is directly stepped on by the game player, it must be durable, and in addition, it has a slip-preventing function so as to ensure that the game player performs suitable stepping. In this embodiment, the first layer 211 is made of EMMA that is, a material having a high slip-resistibility. Further, shallow grooves are formed in the entire surface of the first layer 211. The first layer 211 is grooved by means of a heating roller, a press, and a cutter. As a groove pattern, as shown in FIG. 6, linear grooves 211a (slip preventer) are formed parallel to one diagonal direction of the foot switch sheet 210. The diagonal direction as described above is employed for the reasons described below.

In the dance game described below, the step position is varied to the front, back, left, and right squares with respect to the home position. Therefore, with linear grooves formed parallel to the back and forth direction or left-right direction, when the game player performs stepping parallel to the grooves, there is a likelihood that he or she may slip thereon. However, the linear grooves are formed in the direction parallel to the diagonal direction of the foot switch sheet 210, the foot-step direction intersects all the front, back, left, and right directions. It should be apparent that these groves have a slip-preventing function. The grooves may be formed in both diagonal directions. Also, in view of the efficiency of the slip prevention, the grooves are preferably formed with a pitch of about 2 mm, a depth of 0.02 mm, and a cuneiform or rectangular cross section.

Figures to allow recognition of the positions of the step detection switches (pressure switches) via the transparent first layer 211 are printed on the layer 212. For example, arrow marks (→, ←, ↑, and ↓) indicating directions from the central section are printed at positions on the foot switches provided on the front, back, left, and right with respect to the central section. Because the printing is provided on the second layer 212, even when the game player repeats stepping, the printing marks can be prevented from being erased.

The entire bottom surface of the third layer 213 is formed with a carbon layer, and the carbon layer forms a common electrode 213a. Carbon material enables the thin-film coating, and is suitable as the step detection switch electrode because of its good electrical conductivity and durability.

The fourth layer 214 is used as a spacer that is elastically flexible so as to have a less thickness during stepping by the game player. In addition, a plurality of small openings 214a passing through the layer are provided in the squares on the front, back, left, and right with respect to the central section, which is an appropriate position of the layer, scattering so that at least one of the holes corresponds to the bottom face of a person's foot.

Spot carbon layers are formed at specified positions of the top surface of the fifth layer 215, specifically, on specified positions on the front, back, left, and right sections with respect to the central section. These spot carbon layers serve as electrodes 215a to 215d of the step detection switches. When the game player has performed stepping, the common electrode 213a of the third layer 213 electrically short-circuited to at least one of the specific electrodes 215a to 215d of the fifth layer 215 through the small openings 214a of the fourth layer 214. The size of the small openings 214a is predetermined to a size so that the openings are not pressed and closed completely when the game player has performed stepping, for example, a diameter of 10 mm. For the sake of manufacturing, the small openings 214a of the fourth layer 214 may be provided so as to be scattered uniformly on the entire surface of the fourth layer 214.

In this way, the individual step detection switches are formed of the common electrode 213a of the third layer 213, the fourth layer 214, and the specific electrodes 215a to 215d of the fifth layer 215 in the positions of the squares corresponding to the four printed arrow marks described above.

The sixth layer 216 must be durable to repeated stepping by the game player. It also must have strength sufficient to prevent the plastic deformation of the step detection switches. Therefore, ETV is used as the material of the sixth layer 216. Also, wiring is patterned and printed so as to extend from the four specific electrodes 215a to 215d of the fifth layer 215 up to the connection port 217a that is to electrically connect to the interface circuit 20a of the main controller 100. Also, there are provided a start switch 219a on a left side of the connection port 217a, and a selection switch 219b on a right side of the connection portion 217a. The start switch 219a is turned on to start the game. The selection switch 219b is actuated to select a desired game from a number of selective games. In addition, a connection cable 217b is connected to the connection port 217a. The interface circuit 20a shown in FIG. 2 and a connection plug 217c are provided at the end of the connection cable 217b.

In addition to the four step detection switches described above, game selection switches (pressure switches) maybe provided. In this case, the game selection switches are provided in portions where the step detection switches are not provided, for example, in two squares in the front diagonal to the central section. Appropriate marks (for example, ○ and X marks) indicating the positions of the game selection switches are printed on the squares of the second layer 212; the small openings 214a are provided in the fourth layer 214; and specific electrodes 215e and 215f are formed on the fifth layer 215. These specific electrodes 215e and 215f and the common electrode 213a of the third layer 213 form the two game selection switches.

Figure 7:
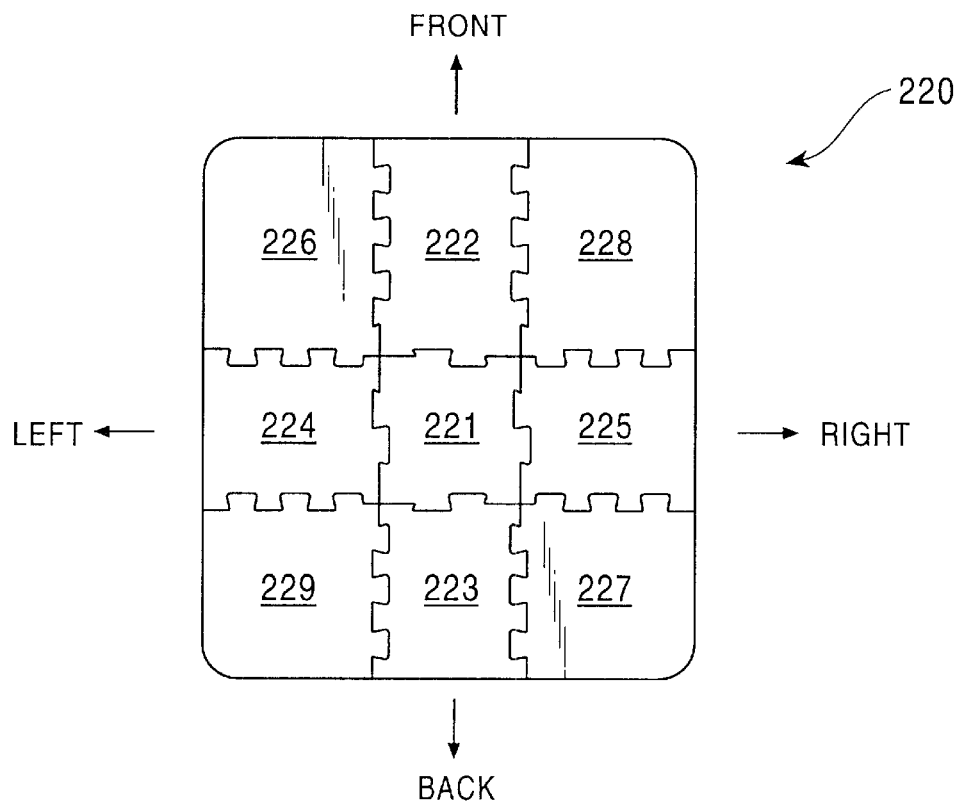
FIG. 7 is a top plan view showing a construction of the mat.

The mat 220 is assembled of nine (3×3) rectangular mat pieces each of which is somewhat larger than the heel of the game player. As shown in FIG. 7, mat pieces 222 to 225 corresponding to the positions where the step detection switches are formed are arranged on the front, back, left, and right of a center piece 221; and mat pieces 226 to 229 are arranged in the remaining four portions, individually being engaged with each other via reverse-trapezoid projections and recesses.

Figure 8:
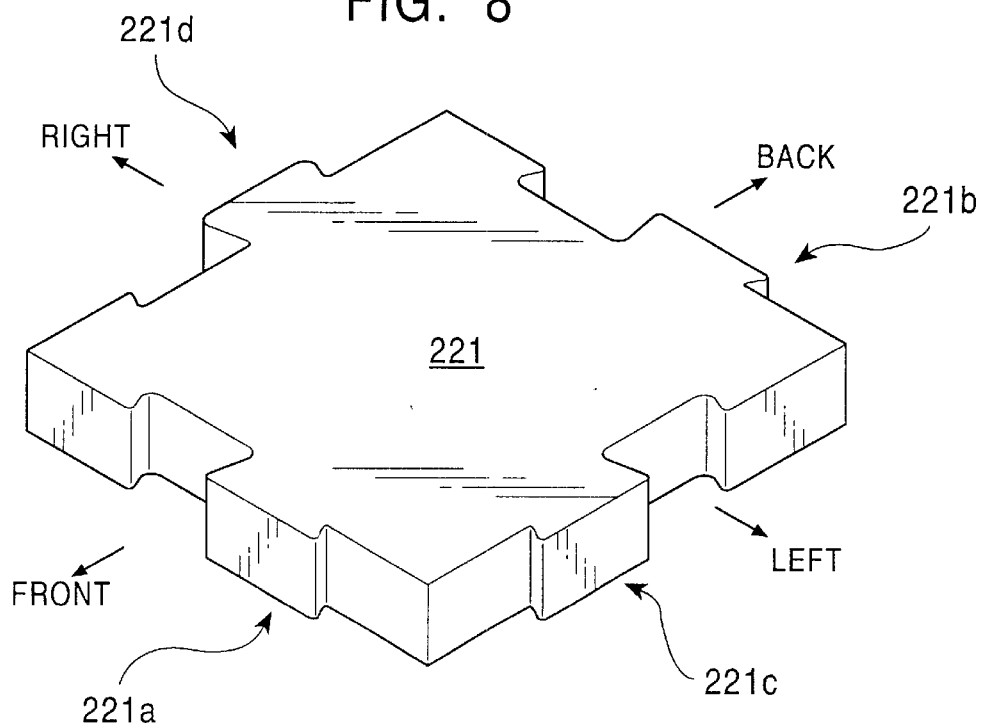
FIG. 8 is a perspective view showing a center piece of the mat.

As shown in FIG. 8, in the center piece 221, only an engaging section 221a of one side of the four sides is formed so as to be different in shape from other engaging sections 221b to 221c. This is because, in the four mat pieces 222 to 225 to be engaged directly with the center piece 221, the mat piece 222 to be arranged in the front is different in shape from others. That is, since the mat piece 222 must be formed somewhat longer by the length of the connection port 217a described above whereas other mat pieces 223 to 225 are identically shaped, no problems arise even when the engaging sections are identically shaped, and in addition, sharing can be implemented, where by assembly is facilitated. Specifically, the shape of the assembly of the reverse-trapezoid projection and recess of the engaging section 221a is arranged such that the shape of the assembly of the reverse-trapezoid projection and recess of the engaging section 221a of the other individual engaging sections 221b to 221d is turned around. The projections and the grooves are arranged to have appropriate dimensions so as to be strong enough to be durable to repeated stepping by the game player.

All the mat pieces 221 to 229 opposing the step detection switches are made of resin so as to secure sound-proofing effects. Among these mat pieces, the mat pieces 222 to 225 are made of a relatively soft material, such as sponge or polyethylene. On the other hand, the other mat pieces 226 to 229 are formed of a relatively rigid material, such as EVA. The mat piece is differentiated in hardness depending on whether or not it opposes the step detection switch, whereby different touch is caused so that the game player feels sinking in the mat when stepping on square positions corresponding to the step detection switches whereas the game player feels almost no sinking in the mat when stepping on other square positions.

Thus, the above arrangement allows the game player to easily recognize whether or not he or she has stepped on the square positions corresponding to the step detection switches without watching the foot to confirm the position during the game. The difference in hardness may be implemented by not only the material, but also surface treatment or shape. For example, many hemispherical protrusions may be formed so as to allow the foot to sense irregular touch, thereby providing substantial hardness sensibility.

Figure 9:
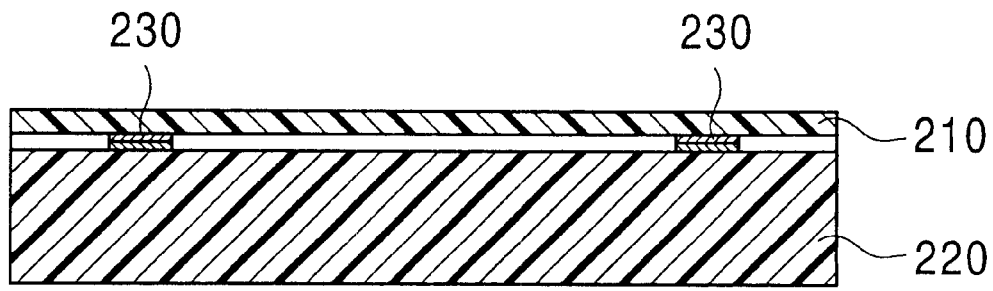
FIG. 9 is a sectional view of an exemplary foot switch sheet.
Figure 10:
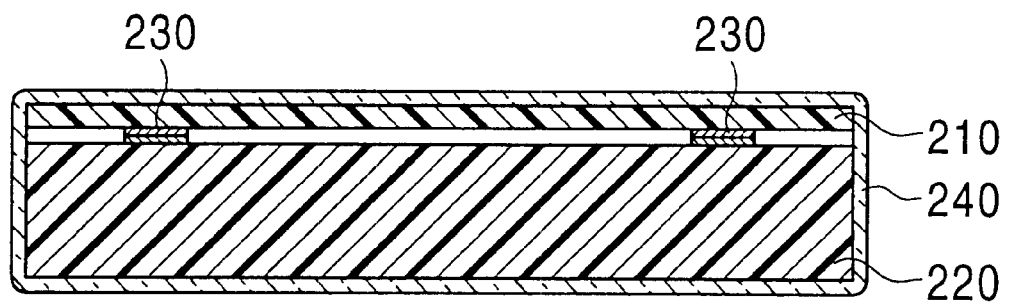
FIG. 10 is a sectional view of another exemplary foot switch sheet.

As shown in FIG. 9, the foot switch sheet 210 is fixed at four places with, for example, connector 230, on the upper surface of the mat 220, thereby preventing the two members from shifting, during the game. Alternatively, as shown in FIG. 10, an assembly of the foot switch sheet 210 fixedly attached on the top surface of the mat 220 with the fasteners 230 may be wrapped with a cover 240. Consequently, no shift occurs between the two members. In this case, the mat 220 is preferably an integral part for the sake of manufacturing, although even pieces can be engageable in the unit of the wrapped assembly described above. In addition, a slip preventing groove is formed on the surface of the transparent cover 240.

(Operation of the Home-use Game Machine)

Referring to FIG. 2, description will be made of a sequence of operations of the home-use game machine. When a power switch (not shown) is turned on, the game machine 1 is then powered on. At this time, if the recording medium 30 exists in the recording-medium driver 19, an operating system allows the CPU 1 to issue a command to the recording-medium driver 19 to read out program data from the recording medium 30. In response to this command, the recording-medium driver 19 reads out image, sound, and program data from the recording medium 30.

The read out image data, sound data, and program data is fed to the decoder 17, and the data is therein subjected to error-correcting processing. The image data subjected to the error-correcting processing is fed to the decompressing circuit 7, and is therein subjected to the above-described decompressing processing. Then, the data is fed to the rendering processor 10, and is thereby written into the no display area of the buffer 11. The sound data subjected to the error-correcting processing in the decoder 17 is fed to one of the main memory 5 and the sound processor 13 and is written to one of the main memory 5 and the buffer 14. The program data subjected to the error-correcting processing in the decoder 17 is fed to the main memory 5 and is written thereto.

Subsequently, the CPU 1 executes the game according to the type of commands which the game player issues via the hand controller 22 and the foot switcher 200. In particular, the CPU 1 performs image-processing control, sound-processing control, and internal-processing control as required according to the type of commands the game player issues via the hand controller 22 and the foot switcher 200.

In this embodiment, the image-processing includes computation of coordinates of individual skeletons and computation of vertex-coordinate data of polygons on the basis of pattern data corresponding to animations which is directed to characters; supply of data such as computed three-dimensional coordinate data and viewing-position data to the graphics-data generator 3; and issuance of rendering commands including data such as address data and brightness data in the no display area of the buffer 11.

The sound-processing control includes issuance of a sound-outputting command to the sound processor 13, and specification of the level, the reverb, and the like. The internal-processing control includes operations according to the operation effected on the hand controller 22.

(Functions of the Game Machine)

Figure 11:
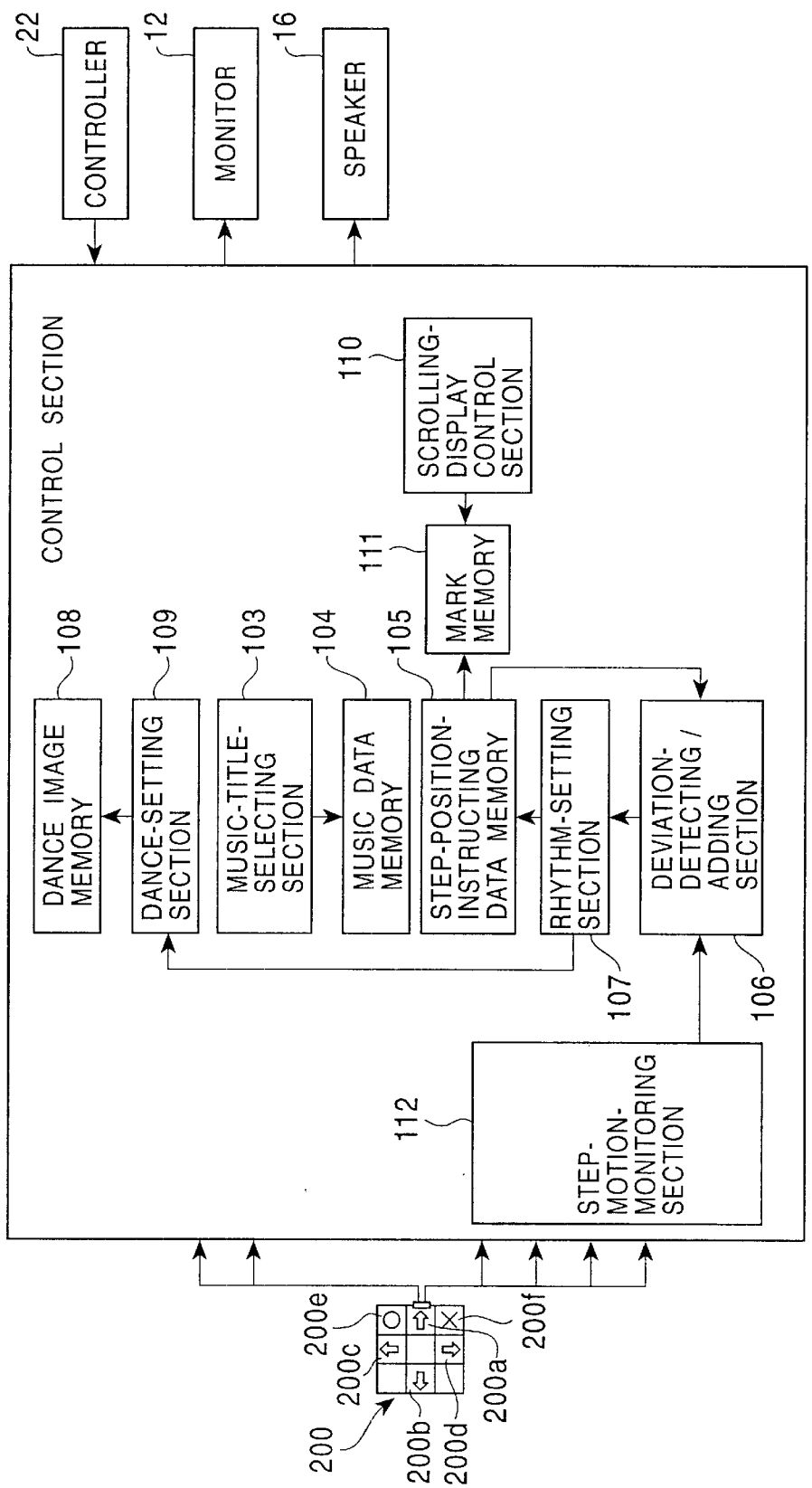
FIG. 11 is a block diagram showing a construction of a main portion of the game machine.

FIG. 11 is a block diagram showing a construction of a main portion of the game machine shown in FIG. 2. As functionally viewed, the control section totally controls operations of the game machine. This control section is constituted of a music-title selecting section 103, a music data memory 104, a step-position-instructing data memory 105, a deviation-detecting/adding section 106, a rhythm-setting section 107, a dance image memory 108, a dance-setting section 109, a scrolling-display control section 110, a mark memory 111, and a step monitoring section 112. Also, the control section is connected to the external monitor 12, speaker 16, hand controller 22, and foot switcher 200. The music-title-selecting section 103 selects a music title corresponding to an instruction signal received from the foot switcher 200 or the hand controller 22. The music data memory 104 stores music data of each music title, that is, music data of individual music pieces associated with music titles. According to this arrangement, in response to a selecting signal from the music-title-selecting section 103, the specified music data is outputted to the speaker 16 in time series.

Figure 12A:
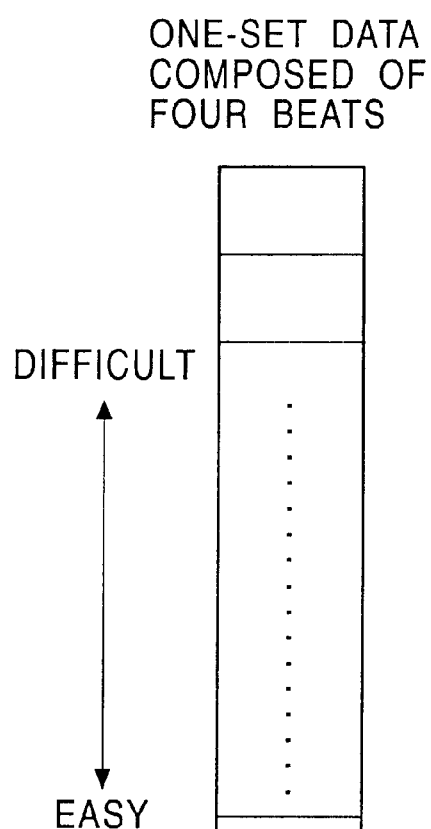
FIG. 12A is a memory map showing a state in which many pieces of step-position data are stored according to difficulty levels.

The step-position-instructing data memory 105 stores multiple pieces of step-position-instructing data corresponding to rhythms such as the number of beats (e.g., four beats and eight beats) according to the rank of difficulty in, a table format as shown in FIG. 12A. A sufficient number of the tables for storing the step-position-instructing data is prepared according to the type in the number of beats, and in addition, the type in rhythm with the same number of beats, for example, the type of music or individual music pieces.

For four beats, each piece of the step-position-instructing data is composed of an one-set data for four time-series instruction types. For eight beats, each piece of the step-position-instructing data is composed of the one-set data for eight time-series instruction types. One-set data is written into each area of the table in FIG. 12A. Also, in view of rhythm, for four beats, various types are prepared, including, for example, a type in which all the four beats have the same pitch or a type in which first two beats are short whereas latter two beats are fast. As for the step-position-instructing data in the same rank of difficulty, a plurality of types is preferably prepared. This embodiment selects a table corresponding to music specified by the music-title-selecting section 103 and outputs one-set data in the selected table to the speaker 16.

The deviation-detecting/adding section 106 obtains the amount of resultant deviation in execution of a step instruction and an actual step. This embodiment measures timing deviation between the above two by use of an internal timer or the like, and obtains the amount of deviation in addition of the step-position-instructing data for the one-set data. According to the result of addition for the first step-position-instructing data which has been obtained by the deviation-detecting/adding section 106, the rhythm-setting section 107 performs evaluation for the one-set data which was second-previously defined for the one-set data in the third or following one-set data, as described below, for increasing or decreasing the level by one rank, and it outputs the result as a defining signal. Also, the defining signal from the rhythm-setting section 107 is also outputted to the dance-setting section 109.

Figure 12B:
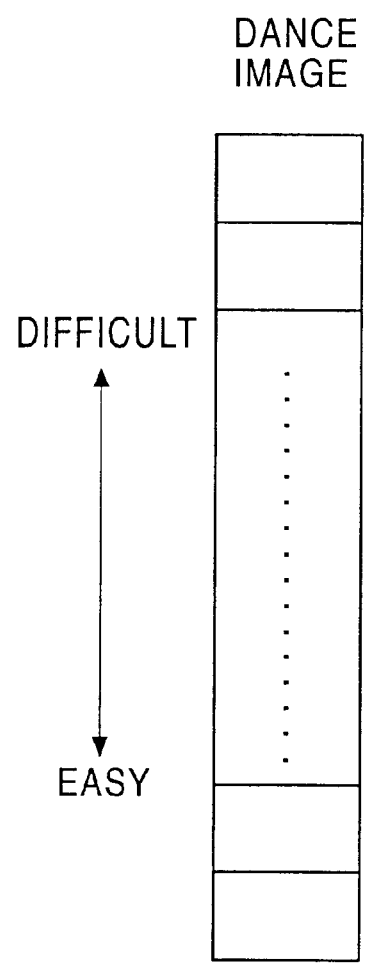
FIG. 12B is a memory map showing a state in which many pieces of dance images are stored according to the difficulty levels.

The dance image memory 108 stores a dance image displayed on a display screen of the monitor 12 in the unit of one-set data, and has tables for storing dance images corresponding to music titles and rhythms. As shown in FIG. 12B, a plurality of the dance images is stored in each table according to the rank of difficulty. Also, multiple types of dance images in the same rank of difficulty are preferably prepared. Upon receipt of a defining signal corresponding to a rank of difficulty from the rhythm-setting section 107, the dance-setting section 109 reads tables, starting with a table in which a dance image is selected for the third or following one-set data.

The scrolling-display control section 110 performs scrolling-display on the display screen of the monitor 12.

Step-position-instructing data (which is referred to as a "step-position-instructing mark", hereinbelow) for the one-set data, which was defined in the rhythm-setting section 107 and was read out of the step-position-instructing data memory 105, is replaced by image data and is temporarily stored in a mark memory 111. The mark memory 111 allows two continuous pieces of the one-set data to be written so that images of the step-position-instructing mark can be displayed on the display screen of the monitor 12 without being discontinued during scrolling display. The scrolling-display control section 110 allows writing the step-position-instructing mark from the mark memory 111 to the buffer 11; (FIG. 2) as a scrolling image in such a manner as to shift readout addresses sequentially at a predetermined time interval. In this way, in addition to non-scrolling dance images, the scrolling step-position-instructing marks also are sequentially transferred to the buffer 11. Furthermore, contents of the buffer 11 are read out repeatedly at a cyclic period of, for example, 1/60 second by well-known display-scanning means and are displayed, step-position-instructing marks are scrolled and displayed, and in addition, dance images are animatedly displayed as background images on the display screen of the monitor 12.

Figure 13:
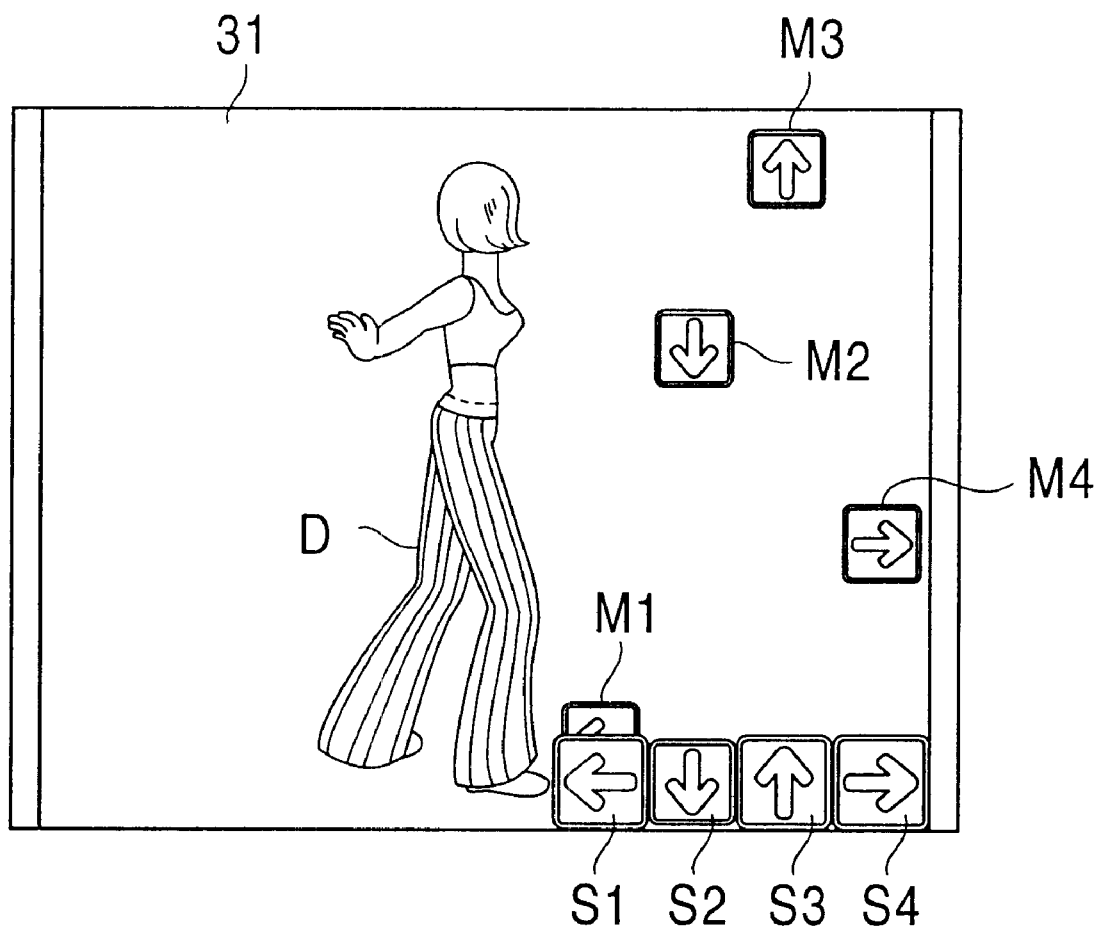
FIG. 13 shows an exemplary monitor display image.

FIG. 13 shows an exemplary display image (mode of four-beat one-set data) on the monitor 12. The figure shows a case where the game player plays the game on the foot switcher 200, and the background of a dance image D, and step-position-instructing marks M1 to M4 that scrolls and moves from an upper portion of the screen toward a lower portion at a predetermined speed are displayed in the order of M1, M4, M2, and M3. Static marks S1 to S4 which are displayed in the lower end of the display screen and represent leftward, downward, upward, and rightward marks provide timing instructions. Condition in which the scrolled mark M completely overlaps (matches) the static mark S guides the game player to the step timing. In time with when the mark M completely overlaps the static mark M, the display brightness or the color of the static mark S is momentarily changed so as to explicitly indicate timing agreement. In this embodiment, the leftward arrow mark 1 corresponds to the step detection switch 200c, the downward arrow mark M2 corresponds to the step detection switch 200b, the upward arrow mark M3 corresponds to the step detection switch 200a, and the rightward arrow mark M4 corresponds to the step detection switch 200d. For reference, the figure shows a dance image in a relatively low rank of difficulty.

The step monitoring section 112 detects whether or not the four step detection switches 200a to 200d, arranged in the foot switcher 200, are switched from the OFF state to the ON state. The step monitoring section 112 processes an ON time when the first one of the four step detection switches 200a to 200d is turned ON as detection data, and in addition, detects the ON state identifiably for each of the step detection switches.

(Game Operations)

Figure 14A:
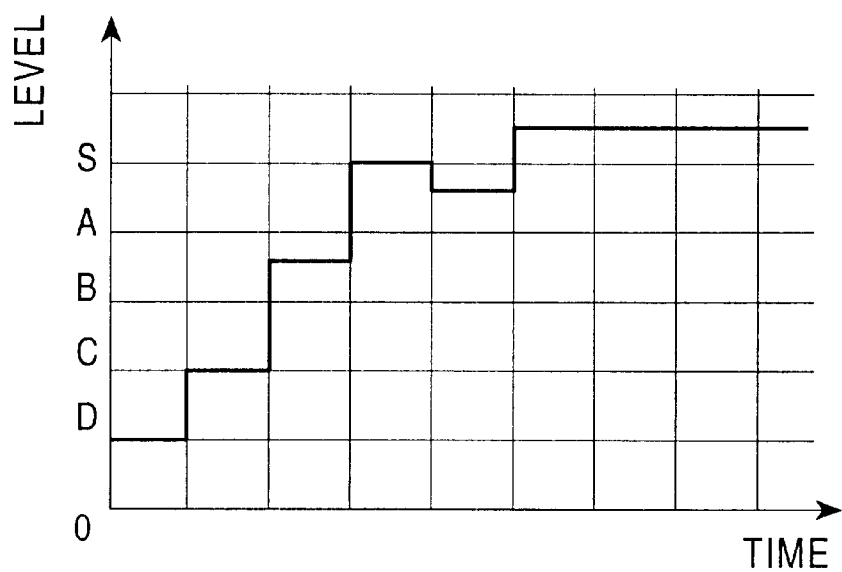
FIG. 14A is a diagram illustrative of evaluation scores.
Figure 14B:
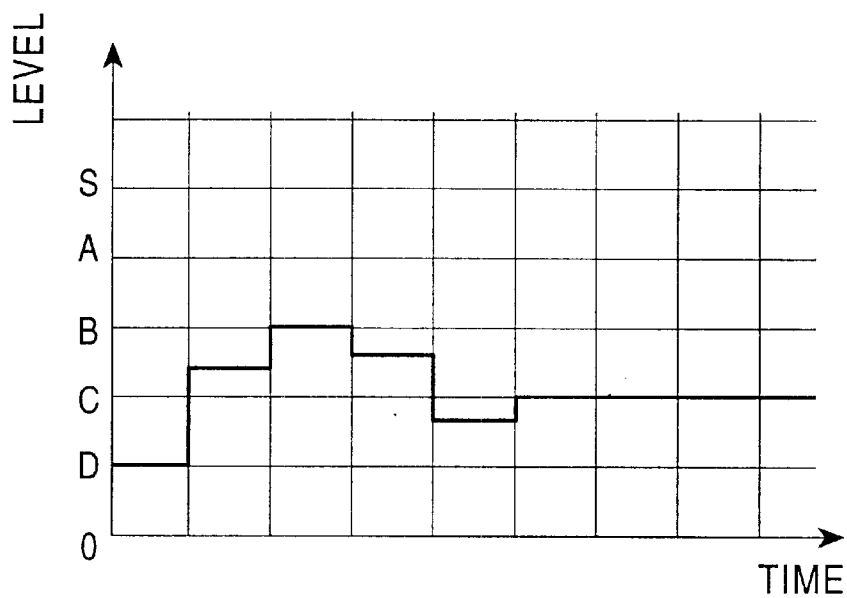
FIG. 14B is a diagram illustrative of evaluation scores.
Figure 15:
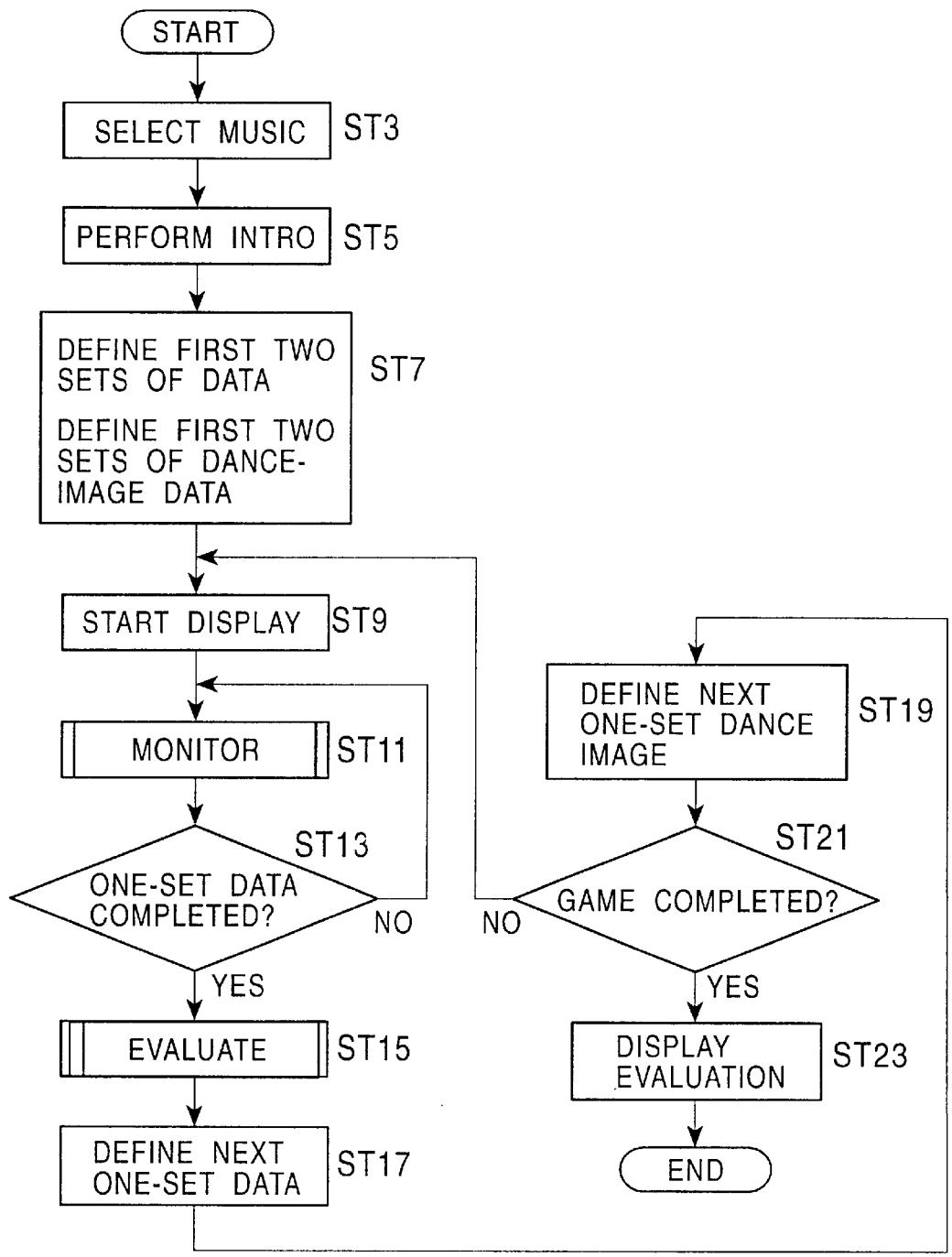
FIG. 15 is a flowchart showing a main routine of operations of the game machine.
Figure 16:
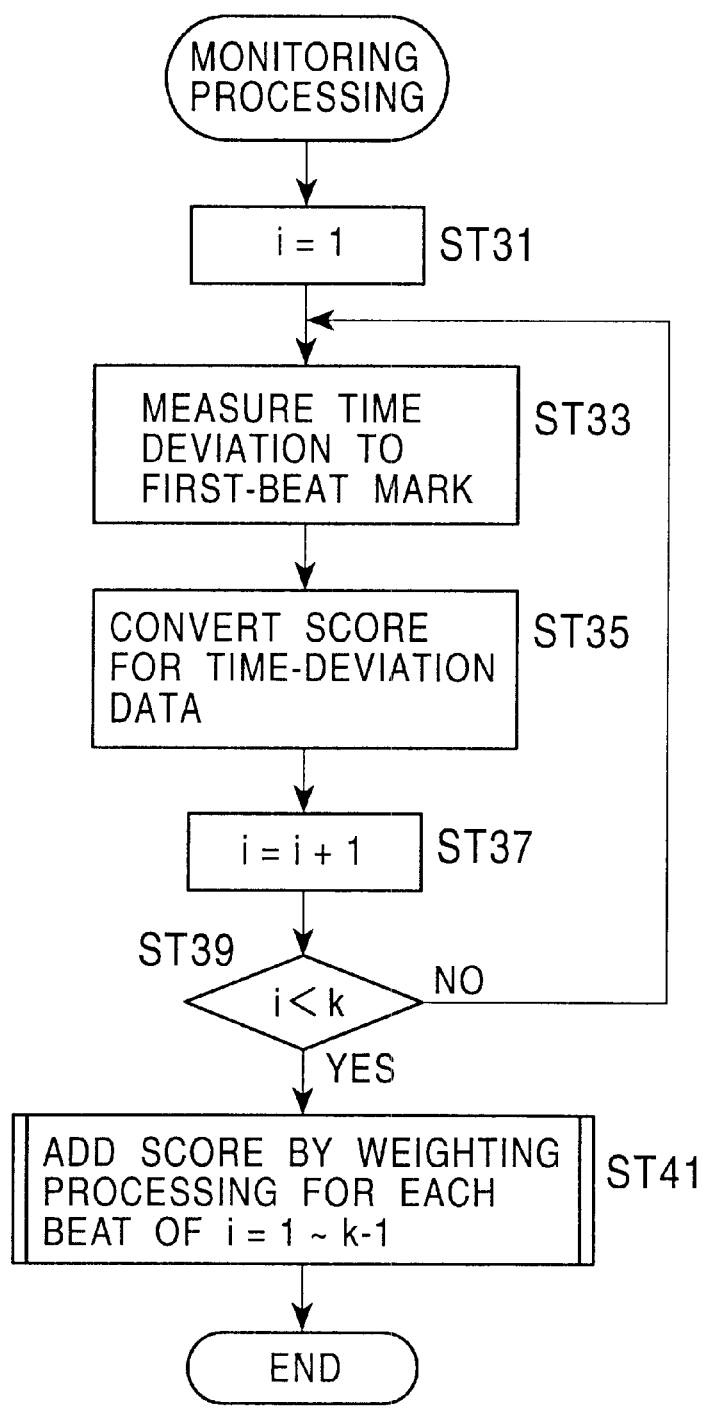
FIG. 16 is a flowchart showing a monitor processing in step ST11 of the main game operation routine.

Next, referring to FIGS. 14 and flowcharts in FIGS. 15 to 17, game operations of the game machine are described.

FIG. 15 shows a flowchart showing a main routine of operations of the game machine. First, upon detection of ON of the start button 22a of the hand controller 22, the monitor 12 displays a music-title selecting image (Step ST3). On this image, for example, music titles are listed vertically and horizontally. When a desired music piece is selected from the list by using, for example, the upward key 22U of the hand controller 22, or a game selection switch 200e, the music-title-selecting section 103 reads out music data corresponding to the selected music title from the music data memory 104, temporarily stores the data in the buffer 14 (shown in FIG. 2), and concurrently outputs the data to the speaker 16 (Step ST5). Upon start of intro music, from the step-position-instructing data memory 105, it is executed to specify a table that contains a rhythm corresponding to the selected music in the number of beats. Also, as first two pieces of one-set data, it is executed to define data on a predetermined position of the table, for example, step-position-instructing data having data of an intermediate difficulty level. Concurrently, according to the aforementioned rhythm, it is executed to define a dance image in a difficulty level corresponding to the difficulty level of the defined step-position-instructing data (Step ST7).

After definition of the first two pieces of one-set data of the step-position-instructing data, as shown in FIG. 13, one piece of the one-set data is scrolled and displayed on a display screen 31 as the step-position-instructing mark M (Step ST9). Upon start of scrolling-display of the individual step-position-instructing marks, the rhythm-setting section 106 starts monitor processing (Step ST11). Monitor processing is executed in the unit of one-set data (Step ST13). Also, upon transfer of the monitoring result for one one-set data, the deviation-detecting/adding section 107 performs evaluation according to the monitoring result (Step ST15).

Upon receipt of the evaluation result, it is executed to define the next one-set data. In specific, upon receipt of the result of evaluation performed according to the result of monitoring. for the first one-set data, it is executed to define a third one-set data. Concurrently, it is executed to define a dance image D corresponding to the defined one-set data (steps ST17 and ST19). In specific, since the step-position-instructing mark for the one-set data defined as the evaluation object has already been scrolled out of the display screen 31, and the step-position-instructing mark according to the next one-set data is being scrolled and displayed on the display screen 31, the one-set data to be defined according to the evaluation result is defined with delay of one piece of one-set data.

It is determined whether or not the game ends, that is, whether or not a predetermined time has passed from the game start time; or whether or not the dance evaluation is maintained to be higher than a predetermined level (Step ST21). If the dance is not ended, control returns to step ST9, and the dance image D and the step-position-instructing mark M are continuously displayed on the display screen 31. Also, steps ST9 to ST19 are repeated sequentially for each one-set data.

If the game is determined to end, it displays the final contents of the rhythm-setting section 107, i.e., the evaluation result for dancing by the game player, on the display screen 31 (Step ST23).

FIG. 16 is a flowchart of a subroutine of the "monitor processing" in step ST11. In this subroutine, the variable "i" is set to "1" (Step ST31). After an ON signal from the step detection switches 200a to 200d (FIG. 11) is detected, which can be actually obtained from the step monitoring section 112 for the step-position-instructing mark M of the first beat, it is executed measurement of ± time deviation as deviation-time data with respect to the time when the mark M completely overlaps the static mark S (Step ST33). In this subroutine, the one-beat cyclic period is divided into ±½ cyclic periods in the time direction (stroke direction of the mark M) with reference to the static mark S. The time deviation is measured by measuring deviation of the detected actual step time from the time when the mark M completely overlaps the static mark S in the divisional periods. The time when the mark M completely overlaps the static mark S can be obtained by calculation from one-beat cyclic period, thereby allowing production of data on time deviation from the time of detection of the ON signal from the step monitoring section 112, which is inputted on condition that the corresponding step detection switches 200a to 200d are stepped. To handle a case when incorrect step detection switches 200a to 200d are stepped, the game machine maybe arranged so as to provide a stricter evaluation, e.g., a reverse evaluation, judging no stepping is carried out. Alternatively, the game machine may be arranged such that incorrect stepping are counted, and when the count reaches a predetermined number, the game is forcibly terminated.

Subsequently, a gap between timing deviated by the ½ cyclic period and timing when the both marks M and S completely overlap each other is converted to an appreciate value, e.g., one of scores "0" to "100" (Step ST35) for representation. For example, the score "0" is represented for an actual step performed at the time deviated by the ½ cyclic period in the opposite directions; and the score "100" represents the actual step performed when both the marks M and S Completely overlap each other.

Upon completion of score conversion of data on one-beat time deviation with respect to the mark M, the variable "i" is incremented by "1" (Step ST37), and determines whether or not the variable "i" is smaller than a predetermined number "K" (Step ST39). The predetermined number "K" is determined corresponding to the number of beats, data of which is contained in the table selected in the step-position-instructing data memory 105, such as in that value "5" is set in the case of the one-set data composed of four beats, and value "9" is set in the case of the one-set data composed of eight beats. When the one-set data is composed of four beats and if the variable "i" is determined to be smaller than "5", control returns to step ST33, and the score is obtained for the next mark M in the same procedure described above. If the variable "i" reaches "5" (YES in step ST39), since a score for four beats is obtained, scoring processing is performed so as to obtain an evaluation for the one-set data by multiplying the individual scores with the variable "i=1 to 4" with a weight coefficient (Step ST41). For example, compared to the first and third beats, the second and fourth beats are difficult in making the rhythm, the weight coefficient of 12.5% is multiplied for the first beat and the third beat, 25% is multiplied for the second beat, and 50% is multiplied for the fourth beat, whereby the score is figured out on the basis of a full score of "100". For reference, for the one-set data composed of eight beats, the weight coefficients may be allocated appropriately so as to be 100% in total. Also, the weight coefficients may be set as desired, or may be set equally by, for example, 25% (in the four-beat mode) and 12.5% (in the eight-beat mode).

FIG. 17 is a flowchart of a subroutine for "evaluation processing" of step ST15. In this subroutine, it is determined whether a score obtained in step ST41 is high, intermediate, or low. The high score ranges from 80 to 100 points, the intermediate score ranges from 21 to 79 points, and the low score ranges from 0 to 20 points.

Now, with the score of 20 points, for the one-set data to be set next, one-set data with the difficulty which is one rank lower than the current rank is defined (Step ST53), and the dance image D also with the difficulty which is one rank lower than the current rank is defined (Step ST55). With the score ranging from 21 to 79 points, for the one-set data to be set next, one-set data with the same difficulty rank as the current rank is defined (Step ST57), and the dance image D also with the same difficulty rank as the current rank is defined (Step ST59). For identical difficulty levels, multiple types of tables for the step-position-instructing data and the dance image D are stored. Therefore, it is preferable to arrange that as many different types of data as possible can be defined for definition of identically ranked data. For example, it is preferable that change is made in the directions of the difficulty level, as shown in FIGS. 12A and 12B, within a range of identically ranked data pieces. Alternatively, its random definition is made within the identical ranks. In contrast, with the score ranging from 80 to 100 points, for the one-set data to be set next, one-set data with the difficulty rank which is one rank higher than the current rank is defined (Step ST61), and the dance image D also with the difficulty rank which is one rank higher than the current rank is defined (Step ST63).

Upon completion of defining processing for the next step-position-instructing data and dance image, the current score is converted to an evaluation score (Step ST65), and adds this score to the immediately previous evaluation score (Step ST67).

FIGS. 14A and 14B are diagrams illustrative of the evaluation score. FIG. 14A shows a state in which the evaluation score increases and is stable in a high level. FIG. 14B shows a state in which the evaluation score slightly increases, but, thereafter, is stable in a low level. The horizontal axis represents time, and thin lines represent time widths of one-set data pieces. The vertical axis represents ranks, and thin lines represent widths of individual ranks ranging from the highest rank S to the lowest rank D. Evaluation is performed sequentially for each of the one-set data, as shown in the FIGS. 14A and 14B, and the evaluation result is added on at each evaluation. This allows the final evaluation to be obtained, thereby rhythm sense and dance ability of the game player can be effectively notified to the game player.

The mat is placed under the foot switch sheet. The mat has a plurality of divisions. The plurality of divisions are different from one another in hardness. The hardness difference makes it possible for the game player to recognize the position of each step detection switch while stepping. Accordingly, the game player, who is trying to step in accordance with instructions on the screen, can recognize the position of step detection switches provided in the foot switch sheet by feeling the hardness of each division of the mat without looking at the foot switch sheet. Further, the mat is advantageous in suppressing noises in stepping.

In the mat that is constructed by separable mat pieces, the center mat piece is in the form of a rectangle, and has the same engagement shape on three sides of the center mat piece. This arrangement makes it easier to assembly or construct the plurality of mat pieces into a single mat because three mat pieces to be engaged with the center mat piece can be the same engagement shape, and can be freely connected with anyone of the three sides of the center mat piece, and a remaining mat piece having a different engagement shape is readily connected onto the remaining side of the center mat piece.

In the foregoing embodiment, the mat is constructed by the nine mat pieces, i.e., 3×3 mat pieces. The entire shape of the mat has substantially the form of a square. However, the entire shape of the mat consisting of 3×3 mat pieces may be circular. Also, not only 3×3 mat pieces, but also a desired number of mat pieces including a center piece may be arranged.

In the foregoing embodiment, the mat pieces are sorted into two groups in the aspect of hardness, in other words, the hardness representing the position of step detection switch and the hardness representing the other positions. However, it may be appreciated to provide three or more hardness groups to give the game player further positional information, fore example, which step detection switch.

In the foregoing embodiment, three sides of the center mat piece are formed with the same shape and the remaining one is formed with a different shape. However, it may be possible to form the four sides of the center mat piece with the same shape. Also, four connection ports maybe provided four sides of the mat respectively.

In the foregoing embodiment, the connection of mat pieces is accomplished by the combination of trapezoid projections and trapezoid recesses, which are formed in the vertical direction of the mat. However, the following connection may be appreciated: An upper half of each side of one mat piece is cut away to form a lower flange on the one mat piece. A lower half of each side of another mat piece is cut away to form an upper flange on the another mat piece. A vertically extending projection is formed on a top surface of the lower flange of the one mat piece and a vertically extending recess is formed in a bottom surface of the upper flange of the another mat piece. Connection of the one and another mat pieces is accomplished by inserting the projection of the one mat piece into the recess of the another mat piece.

It should be noted that the inventive mat can be used not only for use with a foot switch sheet for a dance game machine but also for use with other apparatus, such as quick response performance measurement apparatus, exercise machine.

Further, the inventive foot switch sheet includes a step detection pressure switch arranged internally in at least one of a plurality of regions formed by dividing the sheet. The slip preventer is provided at least in the regions on the surface of the top layer, which is a part of the foot switch sheet. The slip preventer is provided at least in the regions where the pressure switches are provided on the surface of the top layer, thereby enabling prevention problems in which a game player slips on the sheet or slips and falls down during stepping. Consequently, the game player can reliably perform switching operations by stepping on the regions on the surface of the sheet where the pressure switches are arranged.

There is provided a home position on the surface of the first layer, in which grooves are formed in a direction diagonal to a direction from the home position to positions where the individual pressure switches are arranged. These grooves may be provided in only regions where the pressure switches are arranged, and the direction in which the grooves are formed may differ depending upon the region. In this case, the grooves cross always a step out direction; therefore, slip can be effectively and reliably prevented. Also, when the direction in which the grooves are formed is the substantially 45° diagonal direction or substantially +45° and −45° diagonal directions, the grooves prevents slip during stepping effectively.

In the foregoing embodiment, the four step detection switches are provided. However, it may be possible to provide two or three step detection switches, or alternatively more than four. Also, a desired number of game selection switches may be provided.

The grooves formed on the top surface of the foot switch sheet for preventing slip, in the foregoing embodiment, are linearly patterned parallel to one direction of diagonals of the foot switch sheet. However, various other groove patterns can be appreciated, for example, a patter of broken lines, curved lines, polygonal lines, or a combination of a plurality kinds of lines, or a mesh pattern.

In the foregoing embodiment, the present invention is described with reference to a foot switcher for home-use game machine. However, the present invention is not limited to the above-mentioned embodiment, but may be used for other applications, for example, as auxiliary switching tool for handicapped person.

As described above, an inventive mat includes a mat body having a plurality of divisions. One division is different from another division in hardness. The mat may bear a foot switch sheet having a plurality of pressure switches for detecting a step, and a specified number of divisions correspond to the plurality of pressure switches, respectively. The hardness of one division is different from that of another division adjoining the one division.

The mat may consist of nine divisions each having the form of a rectangle, and the nine divisions are arranged three columns and three lines. The foot switch sheet may have four pressure switches, two of the pressure switches being at opposite positions on a first line, and the other two being at opposite positions on a second line perpendicularly intersecting the first line, and four divisions corresponding to the four pressure switches have a hardness lower than the others.

Each of the plurality of divisions may be defined by a separable mat piece. The mat may consist of nine mat pieces each having the form of a rectangle, and the nine divisions are arranged three columns and three lines, and a center mat piece has, three sides formed with the same engagement shape.

Also, an inventive foot switch sheet comprises: a plurality of, pressure switches arranged in a specified pattern for detecting a step; and a top layer for covering the plurality of pressure switches, the top layer being formed with slip preventer. The slip preventer may be defined by a plurality of grooves formed in the surface of the top layer. The top layer may be made of ethylene-methyl methacrylate.

The plurality grooves intersects a line connecting the opposite pressure switches. Alternatively, the plurality of grooves may be formed in only regions corresponding to the pressure switches, and the direction of grooves in one region is different from that of grooves in another region. The grooves in one region intersects a line connecting the opposite pressure switches at +45°, and the grooves in another region opposite to the one region intersects the line at −45°.

The foot switch sheet may have the form of a rectangle, and the grooves extend in parallel to a diagonal line of the rectangular foot switch sheet.

The specified pattern may consist of 3×3 regions, each region having the form of a rectangle, and four pressure switches are arranged in four regions adjoining four sides of a center region.

Further, an inventive foot switcher comprises: a foot switch sheet having a plurality of pressure switches for detecting steps; and a mat placed under the foot switch sheet, and including a mat body having a plurality of divisions, one division being different from another division in hardness, and a specified number of divisions corresponding to the plurality of pressure switches, respectively.

The foot switch sheet and the mat may be removably connected with each other by a connector or fastener, or alternatively may be integrally enclosed by a cover.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A mat comprising:

a mat body having a plurality of divisions, one division being different from another division in hardness.

2. A input device mat according to claim 1, wherein the hardness of one division is different from that of another division adjoining the one division.

3. A input device mat according to claim 2, wherein the mat includes nine divisions each having the form of a rectangle, and the nine divisions are arranged in three columns and three lines.

4. A input device mat according to claim 3, wherein the foot switch sheet has four pressure switches, two of the pressure switches being at opposite positions on a first line, and the other two being at opposite positions on a second line perpendicularly intersecting the first line, and four divisions corresponding to the four pressure switches have a hardness lower than the others.

5. A input device mat according to claim 2, further comprising a connector for removably connecting the foot switch sheet with the mat.

6. A input device mat according to claim 1, wherein each of the plurality of divisions is defined by a separable mat piece.

7. A input device mat according to claim 6, wherein the mat includes nine mat pieces each having the form of a rectangle, and the nine divisions are arranged in three columns and three lines, and a center mat piece has three sides formed with the same engagement shape.

8. A input device foot switcher comprising:

a foot switch sheet having a plurality of pressure switches for detecting steps; and a mat placed under the foot switch sheet, and including a mat body having a plurality of divisions, one division being different from another division in hardness, and a specified number of divisions corresponding to the plurality of pressure switches, respectively.

9. A foot switcher according to claim 8, wherein the hardness of one division is different from that of another division adjoining the one division.

10. A foot switcher according to claim 8, further comprising a connector for removably connecting the foot switch sheet with the mat.

11. A foot switcher according to claim 8, further comprising a cover for enclosing the foot switch sheet and the mat.

* * * * *